（12） United States Patent
Ando

(10) Patent No.: US 6,202,022 B1
(45) Date of Patent: Mar. 13, 2001

(54) VEHICLE-USE DATA PROCESSING SYSTEM, ON-VEHICLE TERMINAL DEVICE CONSTITUTING SUCH SYSTEM, AND NAVIGATION DEVICE

(75) Inventor: Kouichi Ando, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/128,941

(22) Filed: Aug. 5, 1998

(30) Foreign Application Priority Data

Sep. 25, 1997 (JP) .................................................. 9-259461

(51) Int. Cl.[7] .............................. G01C 21/00; G06C 7/78
(52) U.S. Cl. ......................... 701/200; 701/208; 701/210
(58) Field of Search .................................... 701/200, 210, 701/208

(56) References Cited

U.S. PATENT DOCUMENTS 6,018,695 * 1/2000 Ahrens et al. ..................... 701/200
6,041,281 * 3/2000 Nimure et al. ..................... 701/211
6,047,234 * 4/2000 Cherveney et al. ................. 701/200

FOREIGN PATENT DOCUMENTS 0 539 146   10/1992  (EP) .
0 286 105   12/1994  (EP) .
8-138193     5/1996  (JP) .

* cited by examiner

Primary Examiner—William A. Cuchlinski, Jr.
Assistant Examiner—Olga Hernandez
(74) Attorney, Agent, or Firm—Finnegan, Henderson, Farabow, Garrett & Dunner, L.L.P.

(57) ABSTRACT

A user inputs a position of a registration point by using an input device of an on-vehicle navigation device. A navigation ECU transmits the position of the registration point as a maintenance request to an information center. A center control section reads from a facility information memory section facility information of a facility existing at the position of the registration point and returns the facility information as maintenance data to the device. In the vehicle, new registration point data including the position of the registration point and the facility information is stored in a customizing information memory section. The user need only perform a simple operation, e.g., inputting of the position in order to obtain rich and detailed information. Furthermore, the registration point data in the memory section is appropriately updated with the updated information of the information center by using data communication with the information center.

20 Claims, 10 Drawing Sheets

REGISTRATION POINT DATA
BEFORE UPDATING

UPDATED REGISTRATION POINT
DATA AUTOMATICALLY EDITED
BY INFORMATION CENTER

INFORMATION CENTER ADDS INFORMATION

NAME: ○○ Café
MARK: ☕
POSITION: NORTH LATITUDE ××
          EAST LONGITUDE ○○
ADDITIONAL INFORMATION:
    BUSINESS HOURS: 8:00～22:00
    CLOSED: MONDAYS
    RECOMMENDATION: ○×(¥350)

IN-SHOP PHOTO

NAME: ×× RESTAURANT
MARK: 🍴
POSITION: NORTH LATITUDE ××
          EAST LONGITUDE ○○
ADDITIONAL INFORMATION:
    BUSINESS HOURS: 8:00～22:00
    CLOSED: MONDAYS
    RECOMMENDATION: ○×(¥2000)

IN-SHOP PHOTO

EXAMPLE OF TRANSMISSION OF COMPLETE REGISTRATION POINT FILE

EXAMPLE OF TRANSMISSION OF ONLY A PORTION OF REGISTRATION POINT FILE

VEHICLE-USE DATA PROCESSING SYSTEM, ON-VEHICLE TERMINAL DEVICE CONSTITUTING SUCH SYSTEM, AND NAVIGATION DEVICE

BACKGROUND OF THE INVENTION

1. Field of the Invention

The present invention relates to a vehicle-use data processing system which includes an information center and an on-vehicle terminal device and which uses data transmitted from the information center, particularly to a system in which a user can easily register registration point information as customized information. The invention can be suitably applied to a vehicle navigation device.

2. Description of the Related Art

Navigation devices for vehicles are now common. In such navigation devices, ordinarily a map indicating road configuration or topography is displayed. It is also common that marks indicating positions of various facilities are displayed on the map and that a list of the facilities is displayed separately from the map. For example, the various facilities may include gas stations, shops, convenience stores, restaurants, accommodations, public facilities, buildings, or the like. The presentation of such facility information is convenient function of such a navigation device.

For example, a navigation system having the function of indicating facilities is disclosed in Japanese Patent Application Laid-open No. 138193/1996, in which a navigation terminal mounted on a vehicle transmits a present position and a facility classification to a host station. The host station returns to the vehicle the information of the facility which exists around the present position and belongs to the facility classification. In the vehicle, the facility information is displayed.

Furthermore, a recently known navigation device is provided with a function in which a user pre-registers the information of the facility at a desired point at his disposal and this facility information is displayed. The function in which the user registers the desired point is called a point registration function. The user inputs a desired point into the navigation device. In this case, on a display, flags or other default marks are displayed on a map as shown in FIG. 1. Furthermore, the user can change the mark to a mark indicating the classification of the facility, e.g., a coffee cup symbol can be used to indicate a cafe. The user can also enter the name and telephone number of the facility by operating switches. Moreover, the position of the mark can be adjusted by moving the mark. Additionally, an alarm can be set to sound when the vehicle nears the registered point. The input information is stored in the navigation device as registration point information. The user can optionally allow the registration point information to be displayed on the display.

By using the point registration function, the user can register facilities according to his discretion and can conveniently customize or personalize the navigation device.

However, the task of placing a mark indicating the facility classification and entering the facility name, telephone number and another information is very laborious for the user, with the task of entering a facility name using Chinese characters being especially laborious.

Furthermore, in the conventional point registration function, it is difficult to update the registered information. For example, a facility registered as a restaurant may change to a cafe or may move to another location. To update the information on the side of the vehicle in accordance with the change of the facility, the user must input new information into the device. However, it is not easy for the user to obtain the information concerning the facility change. Even if the information can be obtained, such updating work is very laborious for the user.

To make such a navigation device more convenient, it is desirous that more detailed and rich information be presented to the user in addition to the facility location and name. In the known art, however, only the user's input information is stored as the registration point information in the navigation device. Therefore, there remains a strong demand that detailed and rich information be included in the registration point information.

SUMMARY OF THE INVENTION

An object of the present invention is to facilitate a user's point registration work and to provide detailed and rich registration point information.

To attain this and other objects in the present invention, maintenance of registration point information is performed by using data communication between a vehicle and an information center. Maintenance includes a process of adding a facility name or the like to the registration point information and a process of updating old registered information.

A vehicle-use data processing system of the present invention includes an information center and an on-vehicle terminal device connected via a communication means to the information center. Data presented by the information center is used in the vehicle. The on-vehicle terminal device includes a registration point information memory means for storing registration point information such as a position of a registration point as well as facility information for a facility at that point, and a request means for generating a request for maintenance of the registration point information. The on-vehicle terminal device transmits the maintenance request to the information center. The information center has a facility information memory means for storing the facility information together with the position of the facility and a maintenance data preparation means for preparing maintenance data in response to the maintenance request to complete and update the registration point information of the vehicle based on the facility information stored in the facility information memory means. The information center returns the maintenance data to the on-vehicle terminal device.

In the present invention, the maintenance request transmitted from the vehicle to the information center and the maintenance data returned from the information center may have aspects as described in the following (1) to (3):

(1) The position of the registration point is indicated in the maintenance request, and the maintenance data includes the facility information of the facility which exists at the position of the registration point indicated in the maintenance request.

This aspect preferably acts when a user registers a new point. The user inputs the position of the registration point into the on-vehicle terminal device. The input position is stored in the registration point information memory. At this stage, the registration point information includes only the position of the point. The maintenance request indicating the position is transmitted to the information center. The information center reads the facility information of the facility existing in the position of the registration point from the facility information memory. The facility information may include facility name, classification, and other various additional information. For example, the additional information may include operation date, operation content, in-shop photos, recommendation information, or the like. The facility information is transmitted from the information center to the vehicle. According to the aspect, when the user simply inputs the position of a registration point, the registration point information including detailed and rich facility information can be obtained in response to the user's operation.

(2) The position of the registration point and a facility classification are indicated in the maintenance request, and the maintenance data includes the facility information of a facility which exists at the position of the registration point indicated in the maintenance request and also belongs to the facility classification.

This aspect also preferably acts when the user registers a new point. The user inputs the position of the registration point as well as the classification of the facility at the point into the on-vehicle terminal device. For example, a coffee cup mark as described in a previous example is selected for the input of the classification of the cafe. User input of the position and the facility classification is simple. The position of the registration point and the facility classification are transmitted to the information center. The information center reads the facility information to be transmitted to the vehicle from the facility information memory. In some cases, since a plurality of facilities are gathered in the position of the registration point, it is difficult to recognize the facility to be registered from only the position information. Even in this case, by referring to the facility classification, the facility information of the facility the user desires to register can be read exactly. The read facility information is transmitted to the vehicle. As described, according to this aspect, since the facility classification is referred to, the information of the facility the user desires to register can be securely obtained.

(3) The registration point information the vehicle already has is indicated in the maintenance request, and the maintenance data includes updated information for updating the registration point information indicated in the maintenance request.

This aspect preferably acts when the previously prepared registration point information is updated. The filled registration point information including the position of the registration point and the facility information that should have previously been stored in the registration point information memory. The registration point information is indicated in the maintenance request, which may or may not include the registration point information itself. For example, the maintenance request may indicate the date of the previous maintenance to which aspect (1), (2), or (3) is applied. When the date is known, the information used for the maintenance is known by the information center.

The maintenance request indicating the registration point information is transmitted to the information center. Updated information is stored in the facility information memory of the information center. Preferably, updated information of business hours and other detailed information is also stored. The updated information is read to update the vehicle's registration point information. In the example of a cafe, the updated information indicates, for example, that the name, operation hours, or the like has changed, or that the cafe has become a restaurant. The updated information also indicates the business' new location if the cafe has relocated. The updated information further may include information previously not available, but recently obtained by the information center (e.g., a photo of the cafe's interior). The updated information transmitted to the vehicle may include just the changed portion, or may include the complete information. As described, according to this aspect, the registration point information can be easily updated in accordance with changes in the facility, and the updated information can be used.

As previously mentioned, according to the present invention, a user takes related to maintenance of the registration point information, i.e., a user's work to prepare new registration point information or update registered information becomes remarkably easier over that of the conventional art. Furthermore, according to the present invention, the registration point information can have detailed and rich information as aforementioned. The facilitating of operation and the enriching of available information further enhances the convenience of the point registration function in which the registration point information is used.

Moreover, in the present invention, the registration point information may itself be transmitted as the maintenance request from the vehicle to the information center. The registration point information may also be sent as maintenance data from the information center to the vehicle. In an embodiment described later, maintenance relevant data (the maintenance request and the maintenance data) is transmitted in the form of the registration point information.

DETAILED DESCRIPTION OF THE PREFERRED EMBODIMENT

Figure 1:
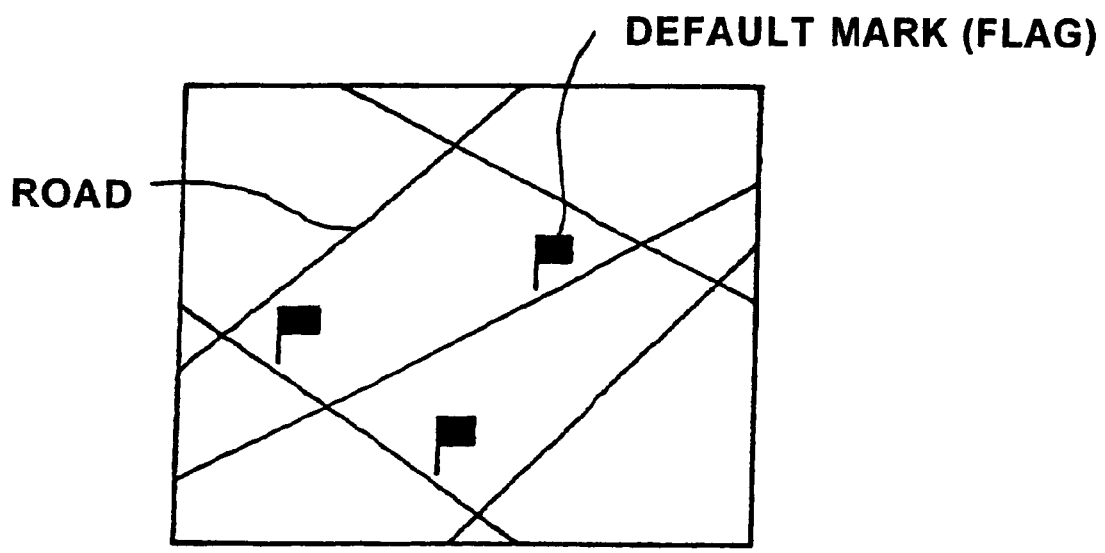
FIG. 1 is a diagram showing a point registration function of a known navigation device.
Figure 2:
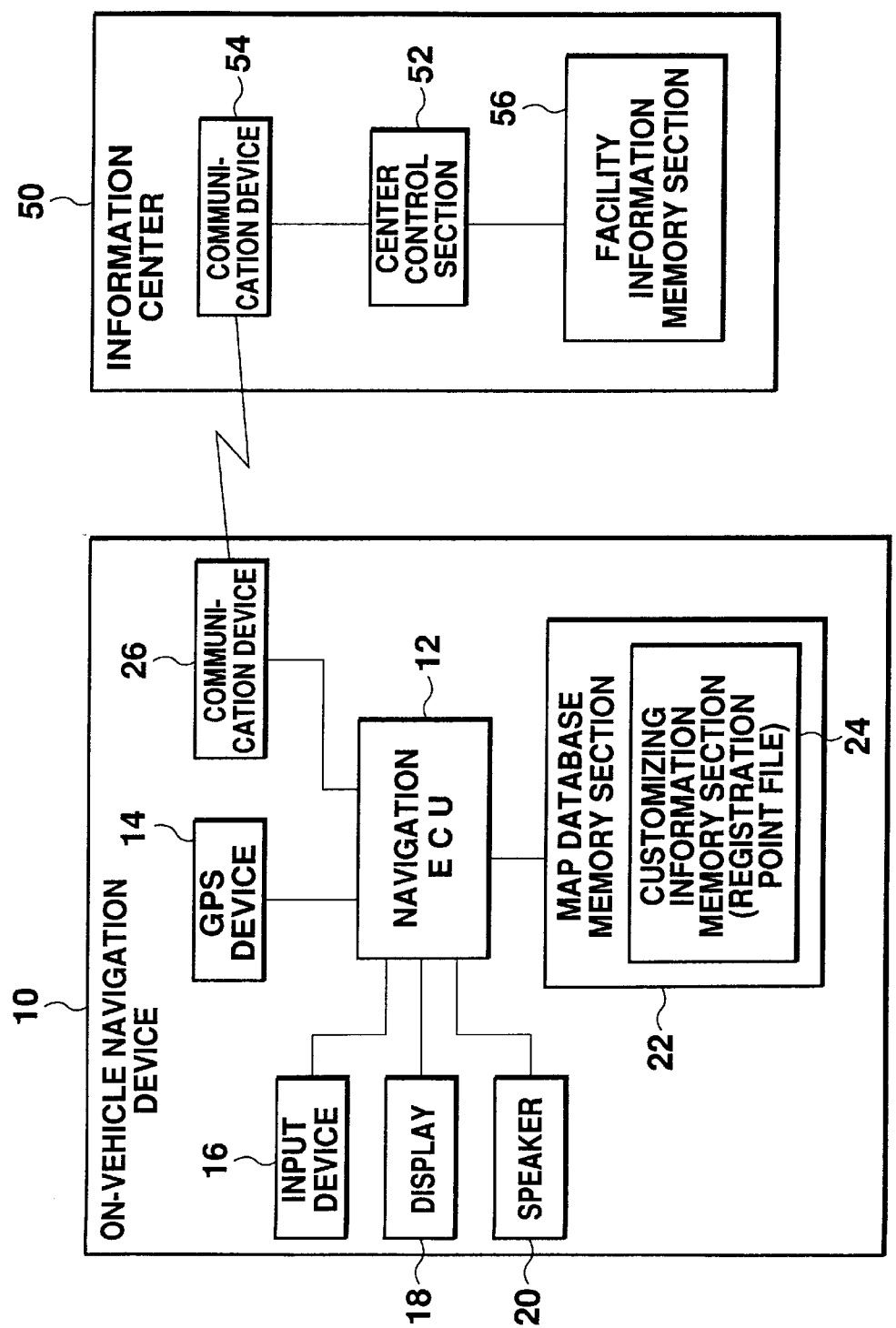
FIG. 2 is a block diagram showing a constitution of an embodiment of the present invention.

A preferred embodiment of the present invention will be described with reference to the accompanying drawings. FIG. 2 is a block diagram showing the constitution of the embodiment. A data processing system of the embodiment includes an on-vehicle navigation device 10 and an information center 50. The on-vehicle navigation device 10 is an on-vehicle terminal device according to the present invention.

The on-vehicle navigation device 10 is provided with a navigation ECU 12 for controlling the entire device. The navigation ECU 12 performs maintenance of registration point information and functions as a maintenance request means in the present invention. The navigation ECU 12 is connected to a GPS device 14. The GPS (global positioning system) device 14 detects the device's present position based on a signal transmitted from an artificial satellite, and transmits the detected present position to the navigation ECU 12. The navigation ECU 12 is also connected to an input device 16 with which a user inputs various instructions (destination and the like) into the navigation device. The navigation ECU 12 is further connected to a display 18 and a speaker 20 as output means. A map or the like for guiding a route is displayed on the display 18. The speaker 20 appropriately emits a phonetic guide.

A map data base memory section 22 is connected to the navigation ECU 12. Wide map data is stored in the map data base memory section 22. The navigation ECU 12 performs various navigation processes using the map data. For example, the navigation ECU 12 may read the map around the present position of the vehicle from the memory section 22 and cause the display 18 to display the read map. Moreover, when the user inputs a destination, the navigation ECU 12 calculates a route using the map data. The route may be calculated using the Dijkstra method or another standard method. The calculated route is displayed on the display 18 so as to differentiate it from other roads.

Figure 3:
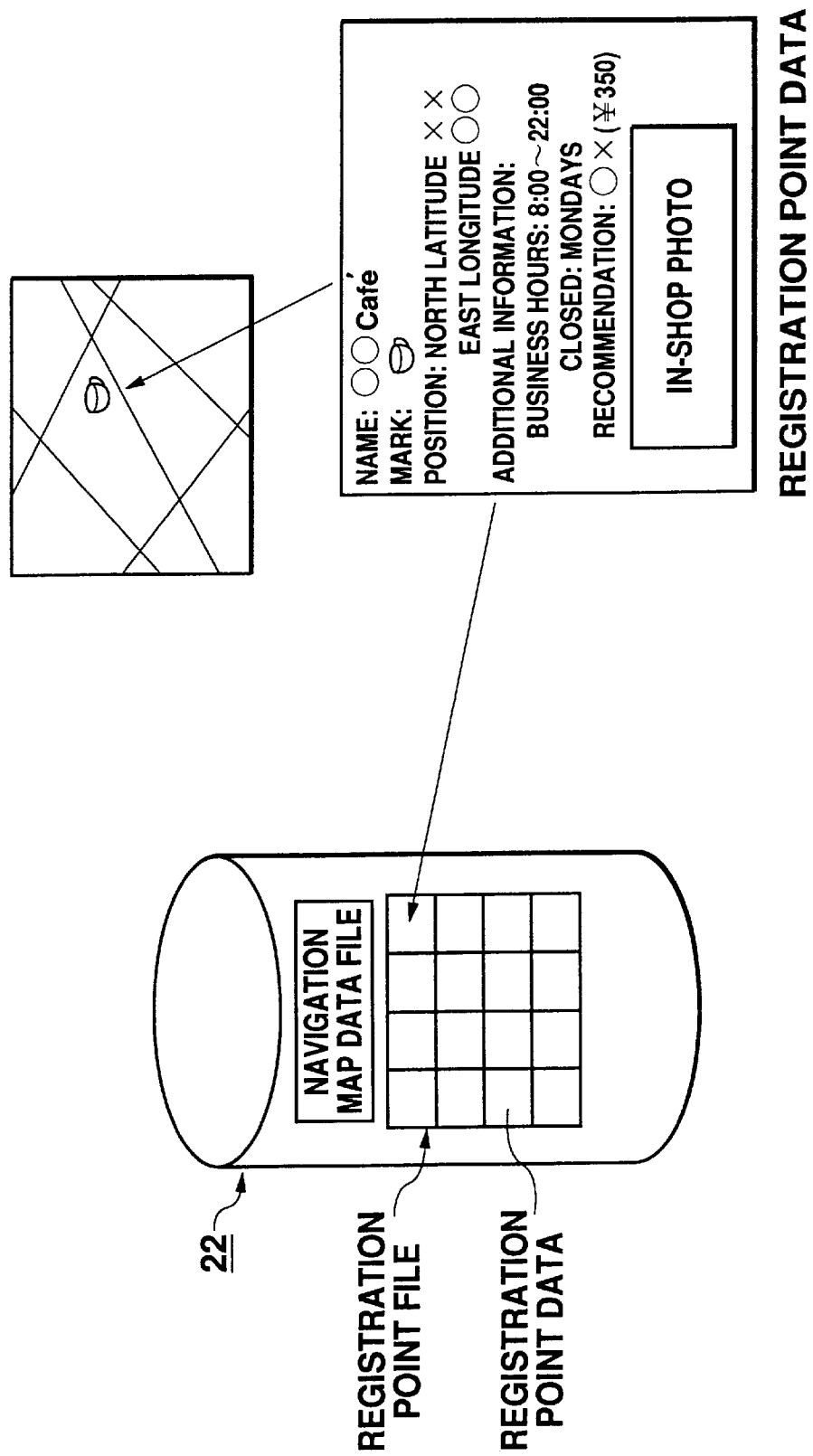
FIG. 3 is a diagram showing a map data base memory section provided on a vehicle in the system shown in FIG. 2.

The map data base memory section 22 is provided with a customizing information memory section 24. A registration point file is stored in the customizing information memory section 24. FIG. 3 shows example contents of the registration point file. Separately from the aforementioned map data, the registration point file is stored in the map data memory section 22. A plurality of registration point data are written in the registration point file. One set of registration point data is shown on the right side of FIG. 3. The registration point data is used as registration point information of the present invention, and includes the name of a facility existing at the registration point, a mark indicative of its facility classification, and the position of the point. As shown in FIG. 3, the registration point data further includes operation hours, recommendation information, and a facility photo as additional information. The facility photo is compressed image data. The registration point data of a cafe is shown as an example in FIG. 3. Therefore, the mark of the facility classification is a coffee cup and the recommendation information is a recommendation menu. Additionally, the position of the registration point is represented by the coordinates (latitude and longitude) of the point.

In the example of FIG. 3, each item of the registration point data is already filled. This condition is referred to as the "filled" condition in the invention. On the other hand, a condition in which only a portion of the registration point data is filled, e.g., a condition in which only the item of the position is filled is referred to as the "unfilled" condition in the invention. After a maintenance processing to be described later, the unfilled data is filled as shown in FIG. 3.

The registration point data is appropriately used by the navigation ECU 12. For example, when the map of the area around the present position is displayed on the display 18, the registration point exists within a displayed range. In this case, the navigation ECU 12 reads the registration point data and displays the mark indicating the facility classification in the position of the registration point. A display example is shown in an upper right portion of FIG. 3. Moreover, when the user selects a certain registration point using the input device 16, the data of the registration point and the map data around the registration point are read from the memory section 22. Then, also as shown in the upper right portion of FIG. 3, the map around the registration point is displayed, as is the mark indicating the position of the registration point.

In response to a user instruction, the name, additional information, or the like are displayed. The information may also be emitted from a speaker 20.

As the map data base memory section 22, a recordable memory device is suitable, and, for example, a magnetic or optical hard disc or a flash RAM may be used. Furthermore, the map data may be stored in a read-only memory device (CD-ROM or the like), while the registration point file may be preferably stored on a recordable media.

Turning back to FIG. 2, the navigation ECU 12 is further connected to a communication device 26. The navigation ECU 12 performs data communication with the information center 50 via the communication device 26. The communication may be performed using a satellite or may also be performed using a circuit of a cellular or portable phone.

On the other hand, the information center 50 is an infrastructure equipment provided with a center control section 52 for controlling the entire center. The center control section 52 functions as a maintenance data preparation means of the present invention. The center control section 52 performs data communication with the communication device 26 of the vehicle using a communication device 54. The center control section 52 is also connected to a facility information memory section 56. The facility information memory section 56 is a memory device for storing a data base which includes a large quantity of data. Information on various types of facilities over a wide area is collected in the information center 50. Each facility information is stored in the facility information memory section 56 in the same manner as the registration point data shown in FIG. 3.

The information center 50 obtains newly prepared facility information as occasion arises. When the facility is changed, the content of the facility change is also obtained by the information center 50. The facility change includes at least one change in facility name, classification mark, position, or additional information. For example, when the facility is renovated, a photo after renovation is obtained. In this manner, the information center 50 obtains and holds the updated information on the facilities.

The point registration function of the embodiment will be described. In the point registration function, the registration point file of the vehicle is maintained through the data communication between the vehicle and the information center. A filling process (1), a filling process (2) and an updating process are included in the maintenance processing. The processes will next be described.

[Filling processing (1)]

The user operates the input device 16 of the navigation device 10 to input the position of the registration point using, for example, one the following methods:

(a) When the vehicle is in a desired position, the user pushes a specific button and the present position when the button is pushed is entered as the position of the registration point.

(b) The user moves a pointer on the map displayed on the screen and pushes a specific button when the pointer reaches a desired position. In this case, the position indicated by the pointer is entered as the position of the registration point.

(c) The user uses the input device 16 to input the address and/or telephone number of the facility at the registration point. The position with the entered address and/or telephone number is entered as the position of the registration point.

Here, in method (c), the position of the registration point is pinpointed. On the other hand, in method (a), the position of the registration point may not be exact because there is a possibility that the input device 16 is operated when the vehicle is slightly apart from the registration point and also because the GPS device 14 may have a range of error in detection of the present position. Furthermore, in method (b), the position of the registration point is also not exactly pinpointed because it is difficult to exactly overlap the pointer on the location corresponding to the position to be registered. Therefore, in both methods (a) and (b), the position of the registration point is only roughly designated.

Figure 4:
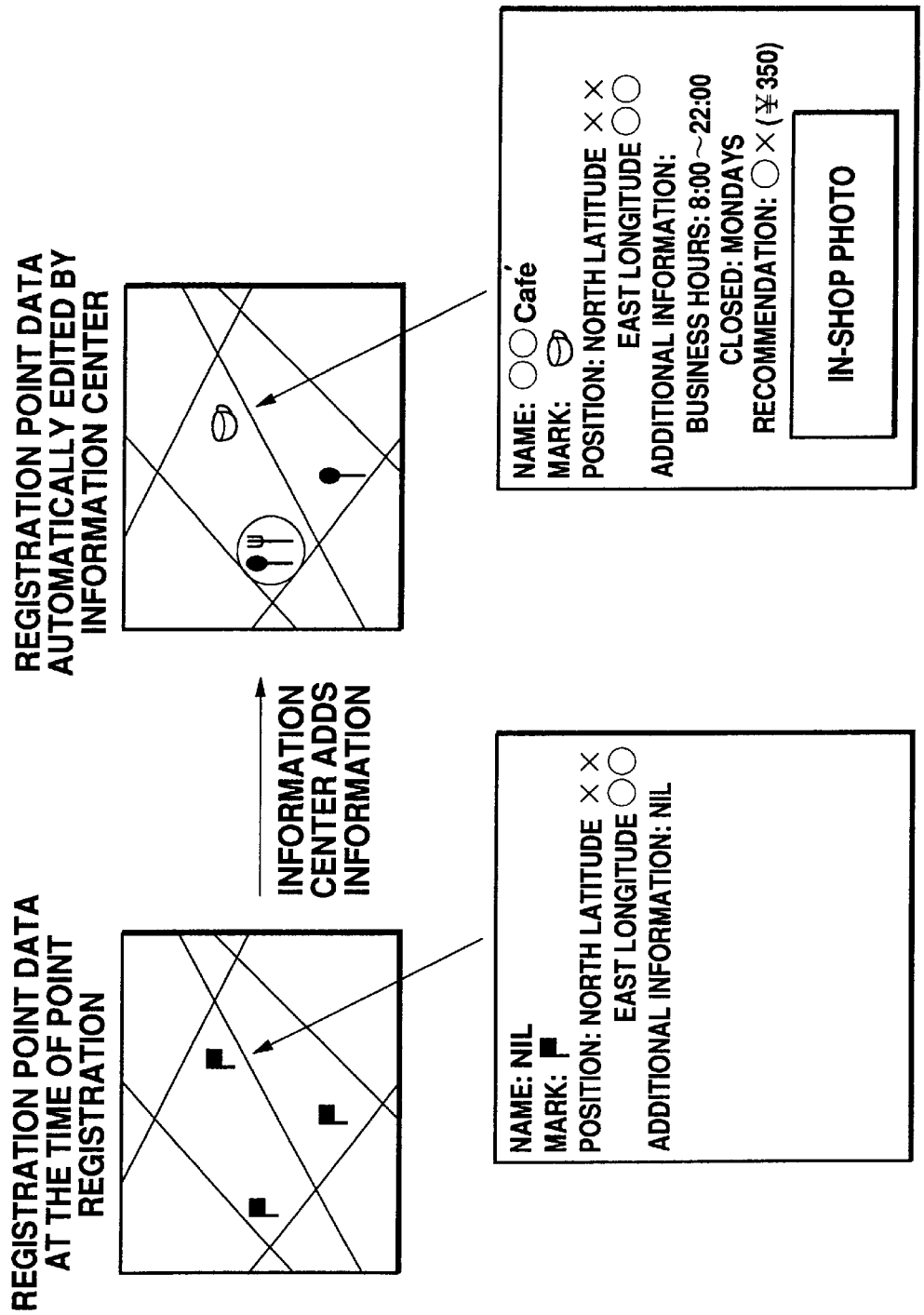
FIG. 4 is a schematic diagram showing a filling process (1) in a registration point data maintenance process.

The position of a registration point entered in this manner is stored by the navigation ECU 12 into the map data base memory section 22. In the registration point file, new registration point data shown in a left-side portion of FIG. 4 is prepared. Only the position data for the registration point is written in the newly registration point data. As a classification mark of the point, a flag is used as a default mark. Therefore, for the new registration point data, as shown in an upper left portion of FIG. 4, a flag mark is displayed on the display 18.

The navigation ECU 12 reads the unfilled registration point data from the memory section 22 and transmits the data using the communication device 26. The position of the registration point is indicated by the registration point data. Therefore, the processing is executed as a preparation and transmission processing of a maintenance request in the invention. The data transmission may be manually performed in response to a user instruction or may be automatically performed by the navigation ECU 12.

The communication device 54 of the information center 50 receives the non-registered registration point data from the vehicle and transmits the data to the center control section 52. In the center control section 52, the registration point data is filled by referring to the information stored in the facility information memory section 56. The control section 52 retrieves the information on the facility existing in the position of the registration point from the memory section 56. Non-written items of the registration point data, e.g., the name and additional information, are filled with the retrieved information. For the facility classification mark, the default mark of the flag is replaced with the mark of the relevant facility.

Here, when the position of the registration point is pinpointed, the information on the facility existing in the designated position is read from the memory section 56. On the other hand, when the position of the registration point is not pinpointed, the information on the facility closest to the designated position is retrieved and read by the center control section 52. In the latter case, in many cases the coordinate of the position entered by the user slightly deviates from the actual position coordinates of the facility. Therefore, the item of the position in the registration point data is appropriately corrected.

The right-side portion of FIG. 4 shows the registration point data which is edited by the center control section 52 as aforementioned. The filled registration point data after the automatic edition is transmitted by the center control section 52 via the communication device 54 to the vehicle. The registration point data includes information for filling and updating the registration point data (having only the position at present) of the vehicle. Therefore, the processing is executed as a transmission processing of maintenance data in the invention. Specifically, the filled registration point data is transmitted as the maintenance data.

In the vehicle, the registration point data is received by the communication device 26 and then transmitted to the navigation ECU 12. By the navigation ECU 12, the unfilled registration point data in the registration point file is rewritten into the filled registration point data transmitted from the information center. In this manner the registration point data is filled and updated. By using the registration point data, as shown in the upper right portion of FIG. 4, marks indicating the facility classification are displayed on the screen instead of the default marks of the flags.

The outline of the filling process (1) has been described above. Additionally, when the position of the registration point is not pinpoint-designated, the following processing may be executed. In some cases, a plurality of facilities are clustered around near the position of the registration point. In this case, there is a possibility that the information center can not decide which facility the user wishes to register. Therefore, all facilities existing in a predetermined range (e.g., within a radius of 50 m) around the position of the registration point are retrieved and a predetermined number of facilities (e.g., five) closest to the designated position are selected in order from the plurality of retrieved facilities. For all these facilities, the filled registration point data is prepared and transmitted to the vehicle. In the vehicle, the navigation ECU 12 displays the predetermined number of the registration point data in a list on the display 18. By referring to the list, the user selects a desired facility to be registered. In this way, the user's desired facility can be registered with sureness.

[Filling processing (2)]

Figure 5:
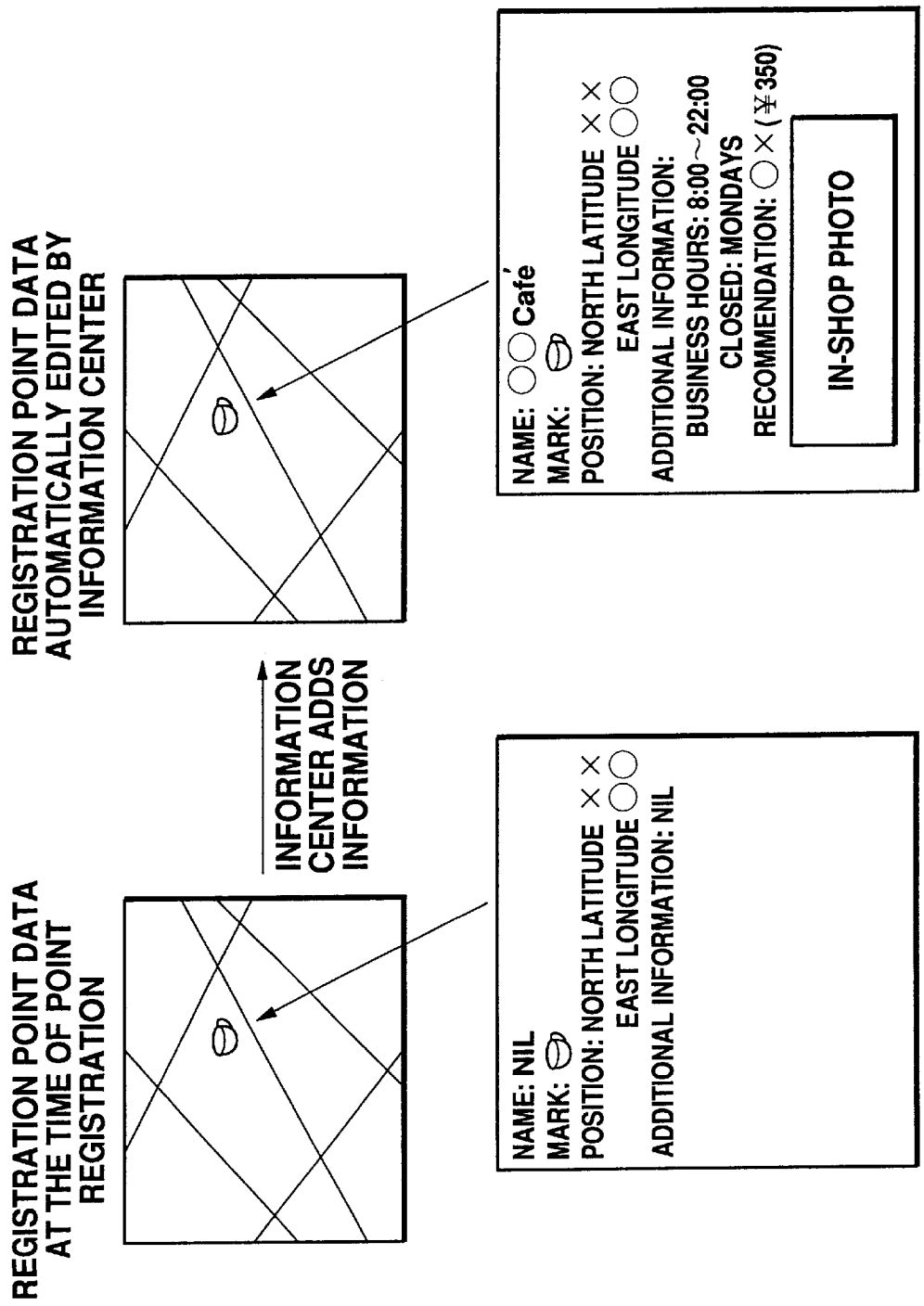
FIG. 5 is a schematic diagram showing a filling process (2) in the registration point data maintenance process.

A filling process (2) of the present embodiment will be described by referring to FIG. 5 and mainly describing the differences from the filling process (1).

In the same manner as the filling process (1), a user inputs a position of a point to be registered. Furthermore, in the process, the user also inputs the classification of the facility to be registered using the input device 16. For example, a list of classification marks of various facilities may be displayed on the display 18 and a user may select a desired mark from the displayed marks. In response to the input operation of the user, the navigation ECU 12 prepares new registration point data in the registration point file. The new registration point data is shown in a lower left portion of FIG. 5. At present, only the classification mark and the position entered by the user are written. Therefore, the registration point data remains unfilled. The unfilled registration point data is transmitted from the vehicle to the information center 50. Here, the registration point data is sent as a maintenance request of the invention.

In the information center 50, blank items of the registration point data are filled in the same manner as the filling processing (1). At this time, since the user already inputs the facility classification mark, the other portions are filled in with data.

Here, when the position of the registration point is pinpointed, the registration point data is edited using the information on the facility existing in the designated position. On the other hand, when the position is not pinpointed, the facilities which exist in a predetermined range (e.g., within a radius of 100 m) around the designated position and belong to the entered facility classification are retrieved and the facility closest to the designated position is selected from the retrieved facilities. The registration point data is edited using the information on the selected facility and the edited registration point data is transmitted as the maintenance data of the invention from the information center 50 to the vehicle.

In the same manner as the filling process (1), the unfilled registration point data in the registration point file is rewritten into the registration point data which is transmitted from the information center. In this manner, in the filling process (2), by referring to the facility classification, the user's desired facility can be securely registered even when the position of the registration point is not pinpoint-designated.

[Updating Process]

An updating process of the embodiment will be described with reference to FIG. 6. The object to be updated is the registration point data which is already in the filled condition. For example, the registration point data filled in during filling processing (1) or (2) and the data previously updated in the updating process is subjected to updating processing.

Figure 6:
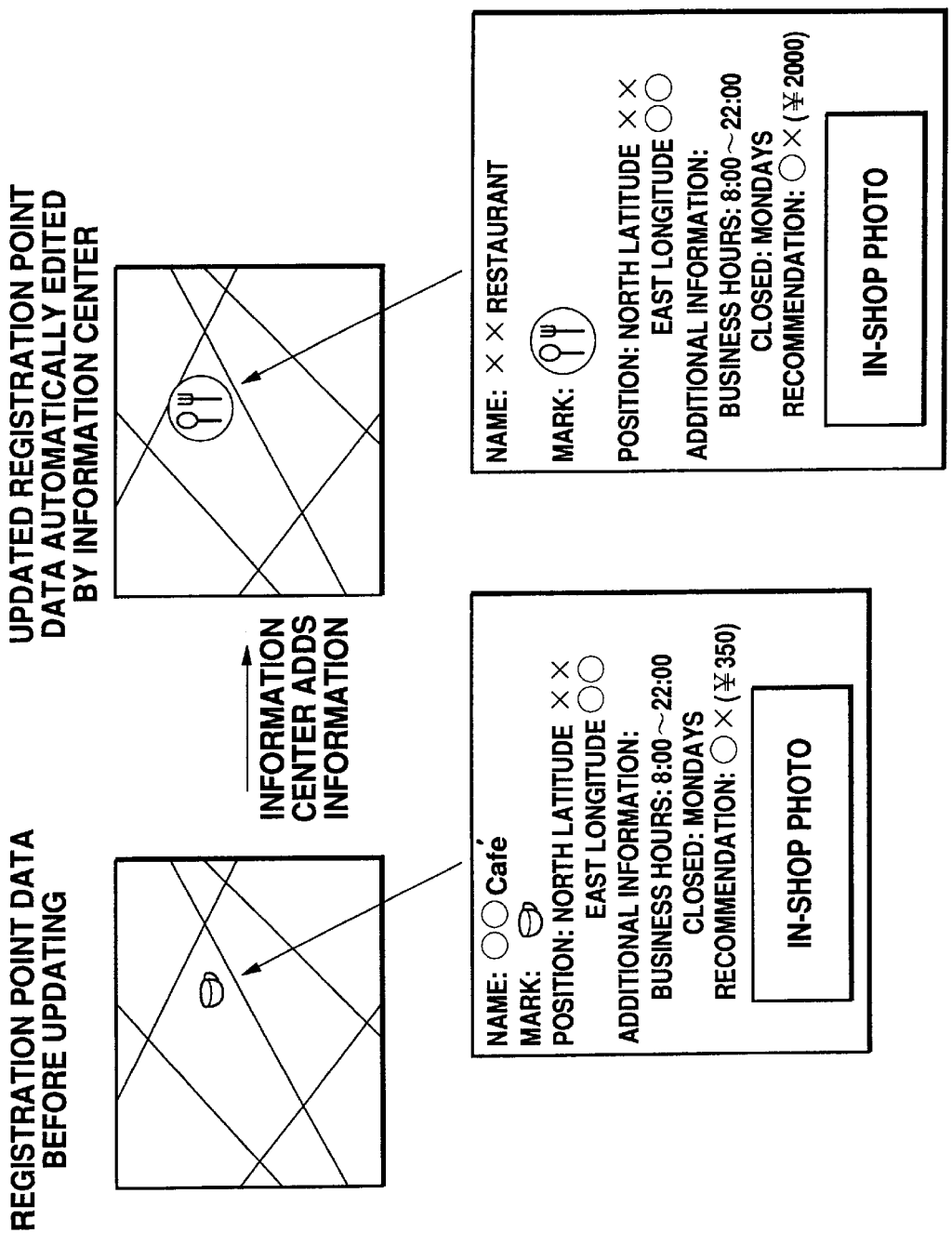
FIG. 6 is a schematic diagram showing an updating process in the maintenance process of registration point data.

A left-side portion of FIG. 6 shows an example of the registration point data before updating which is stored in the map data base memory section 22 of the vehicle. As shown in FIG. 6, the registration point data includes information on the cafe used in previous examples. For example, when the user passes the registration point and notices that the cafe is no longer there, the user instructs the on-vehicle navigation device 10 to update the data of the registration point. The navigation ECU 12 then reads the registration point data designated by the user and transmits the data via the communication device 26 to the information center 50. Here, the registration point data is transmitted as the maintenance request of the invention.

In the information center 50, the registration point data to be updated is received by the communication device 54 and transmitted to the center control section 52. The center control section 52 reads the information on the relevant facility to be updated from the facility information memory section 56. The read updated information and the registration point data before updating are compared, and any discrepancies therebetween are detected. For the detected discrepancy, the content of the registration point data is changed (corrected) to eliminate the discrepancy. A right-side portion of FIG. 6 shows the updated registration point data which is automatically edited in the information center. The registration point data is rewritten from the data of the cafe to the data of a restaurant.

The updated registration point data is transmitted as the maintenance data from the center control section 52 via the communication device 54 to the vehicle. In the vehicle, the updated registration point data is received by the communication device 26 and transmitted to the navigation ECU 12. New registration point data is written on the registration point data by the navigation ECU 12 before updating in the registration point file.

When the registration point data to be updated already comprises the updated information, no updating is necessary, and the registration point data is returned to the vehicle without the contents thereof being changed. Alternatively, the information center may notify the vehicle that updating is unnecessary.

In the example of FIG. 6, the cafe has relocated to another point. In this case, it is considered preferable that not only the registration point data of the new restaurant, but also the registration point data of the relocated cafe be automatically edited and transmitted to the vehicle.

In the above description, the input of an updating instruction by the user is illustrated as an updating processing timing. Alternatively, the navigation ECU 12 may automatically perform the updating processing on its own judgment.

Furthermore, the updating processing can be modified as follows. The information center 50 has the same registration point file as the file of each vehicle. The registration point file of the information center is rewritten in the same manner as the file of the vehicle every time the filling processing or the updating processing is executed. The center control section 52 monitors the condition of the facility indicated by the registration point data in the registration point file. If some change occurs in the facility, the latest registration point data is prepared using the data in the facility information memory section 56. The registration point data is transmitted to the vehicle as the maintenance data via the communication device 54. In the vehicle, the navigation ECU 12 uses the data transmitted from the information center to update the registration point data in the registration point file.

The maintenance processing of the present embodiment has been outlined above. When the maintenance processing is executed, there may be cases where (1) batch maintenance of the entire registration point file is performed or where (2) maintenance is performed in registration point units. Either of these processes may be selected by the user or, alternatively, the navigation ECU 12 may automatically perform (1) batch maintenance or (2) individual maintenance as required. The flow of each maintenance process will next be described.

[Batch Maintenance Process]

Figure 7:
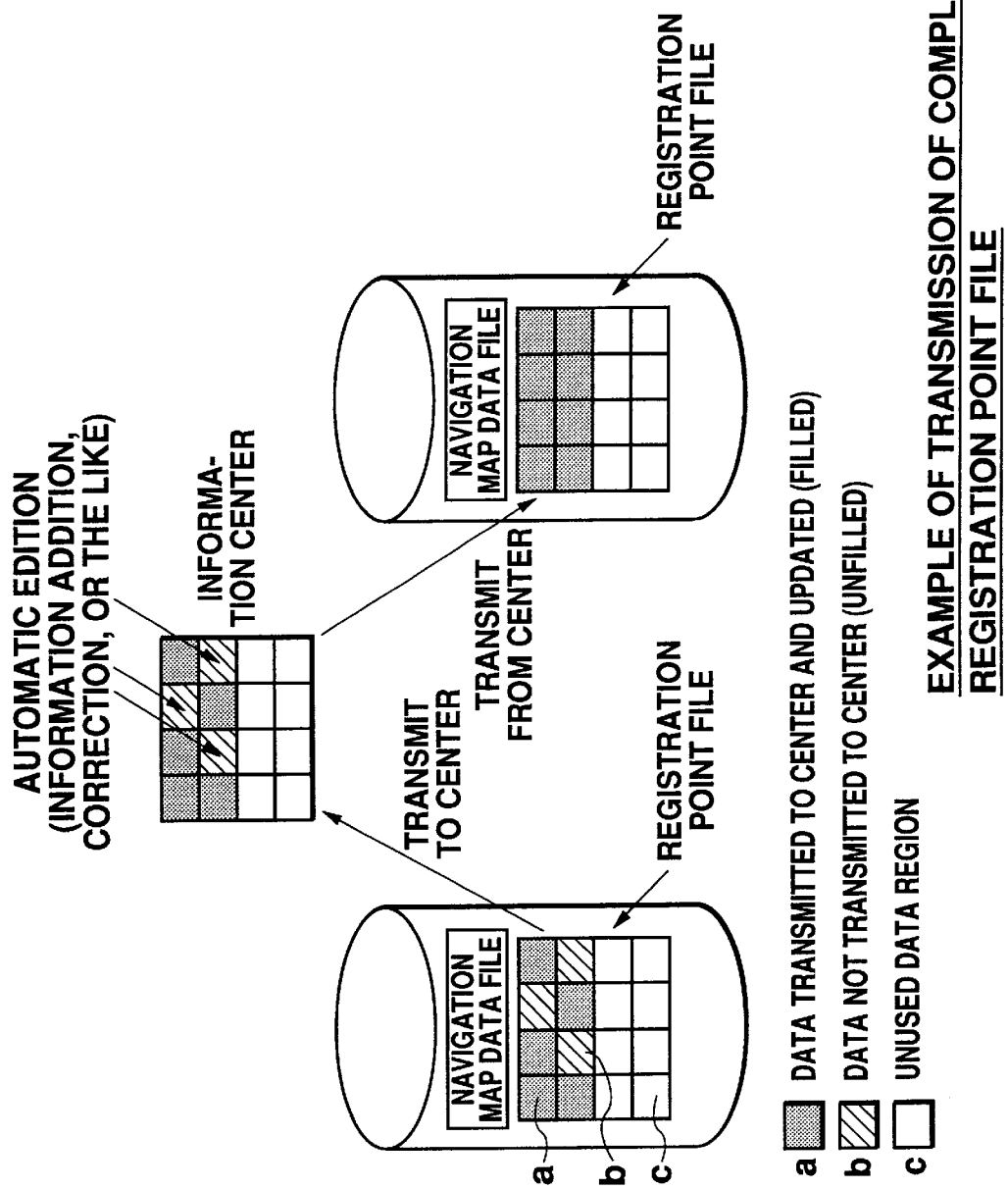
FIG. 7 is a schematic diagram illustrating a registration point file batch maintenance process.

FIG. 7 shows an outline of the batch maintenance process. A left-side portion of FIG. 7 shows the condition of the map data base memory section 22 before maintenance. The registration point file includes both filled and unfilled registration point data. In FIG. 7, blank fields indicate regions in which no registration point data is written.

In the batch maintenance, as shown in FIG. 7, the complete registration point file is transmitted to the information center. Specifically, the registration point file per se is transmitted as the maintenance request of the invention. In the information center 50, the point data in the registration point file is individually subjected to maintenance processing and unfilled data is subjected to filling processing. For the filled point data, the updating processing is performed. Therefore, after maintenance, all the registration point data in the file are filled and have the updated information. After the maintenance, the complete file is returned to the vehicle. Here, the registration point file is transmitted as the maintenance data of the invention. The registration point file is written over the file before the maintenance in the memory section 22.

Figure 8:
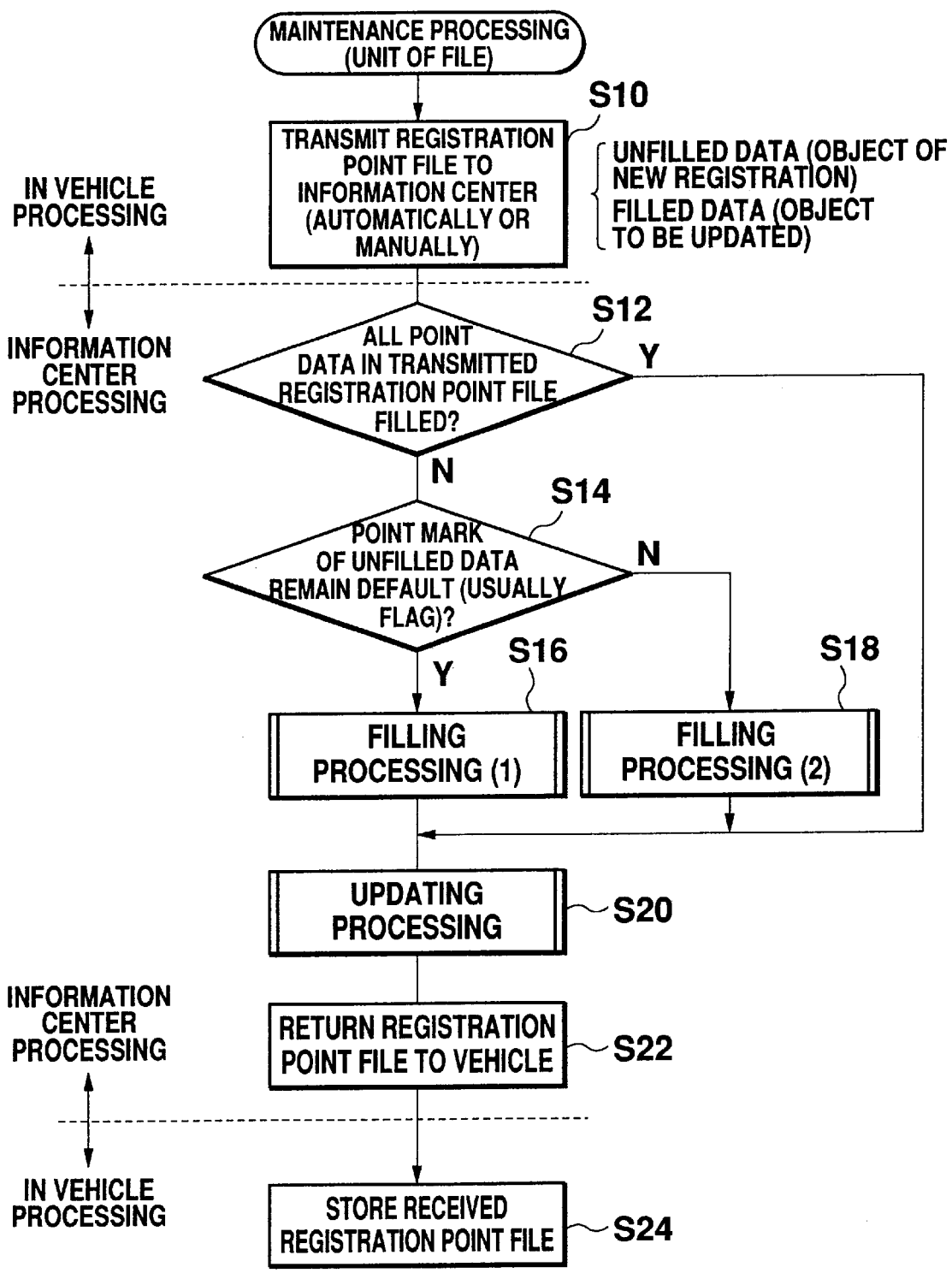
FIG. 8 is a flowchart for the batch maintenance process.

FIG. 8 is a flowchart showing the flow of batch maintenance processing. The navigation ECU 12 transmits the registration point file to the information center 50 (S10) The transmission may be automatically performed by the navigation ECU 12 or may be manually performed in response to a user instruction. The center control section 52 sees whether or not the content of all the point data in the registration point file transmitted from the vehicle is filled (S12). When all the point data items are filled, the data is updated (S20). In this case, when a certain registration point data in the file has the updated information, the content of the data is unchanged.

When all the data items are not filled at S12, the processing advances to S14 and it is judged for all of the unfilled data at S14 whether or not the point mark indicating the facility classification remains a default (flag). Data in which the point mark remains the default is subjected to filling processing (1) (Si6). The unfilled data which has a point mark other than the default is subjected to filling processing (2) (S18). After the filling processing, the process advances to S20. Here, the filled point data in the registration point file is updated. As a result of the processes, all the registration point data in the registration point file are filled and have the updated information. The registration point file is returned to the vehicle (S22). In the vehicle, the navigation ECU 12 writes the received registration point file to the map data base memory section 22.

[Individual Maintenance Process]

Figure 9:
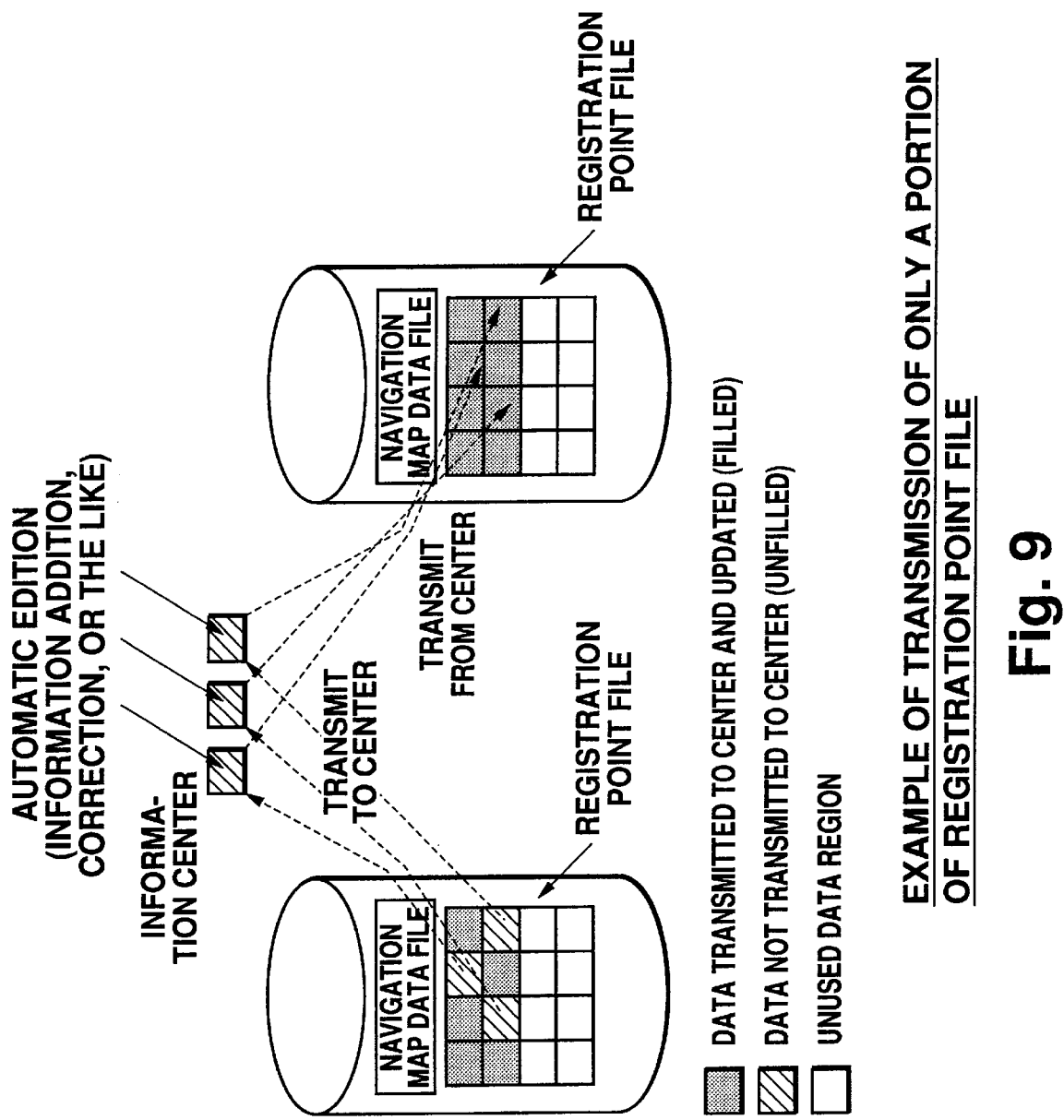
FIG. 9 is a schematic diagram showing an individual maintenance process of each registration point data.

FIG. 9 outlines the individual maintenance processing. A left-side portion of FIG. 9 shows the condition of the map data base memory section 22 before the maintenance. Both filled point data and unfilled point data co-exist in the registration point file. In the individual maintenance processing, the point data is selected for maintenance from the point data which exist in the registration point file. While in the example of FIG. 9, unfilled data is selected; filled data may also be selected. The registration point data as the maintenance object may be designated by the user with the input device 16. The registration point data as the maintenance object may be automatically selected by the navigation ECU 12. For example, at the time of new registration, when new registration point data is prepared for the position of the registration point entered by the user, the new registration point data is automatically selected as the maintenance object by the navigation ECU 12.

The registration point data as the maintenance object is culled from the registration point file and transmitted to the information center 50. Here, the transmitted registration point data is itself sent as the maintenance request. In the information center 50, the maintenance of the transmitted registration point data is performed, the unfilled data is filled, and the filled data is updated. The registration point data after the maintenance is transmitted from the information center 50 to the vehicle as the maintenance data. In the vehicle, the received registration point data is written over the pre-maintenance registration point data.

Figure 10:
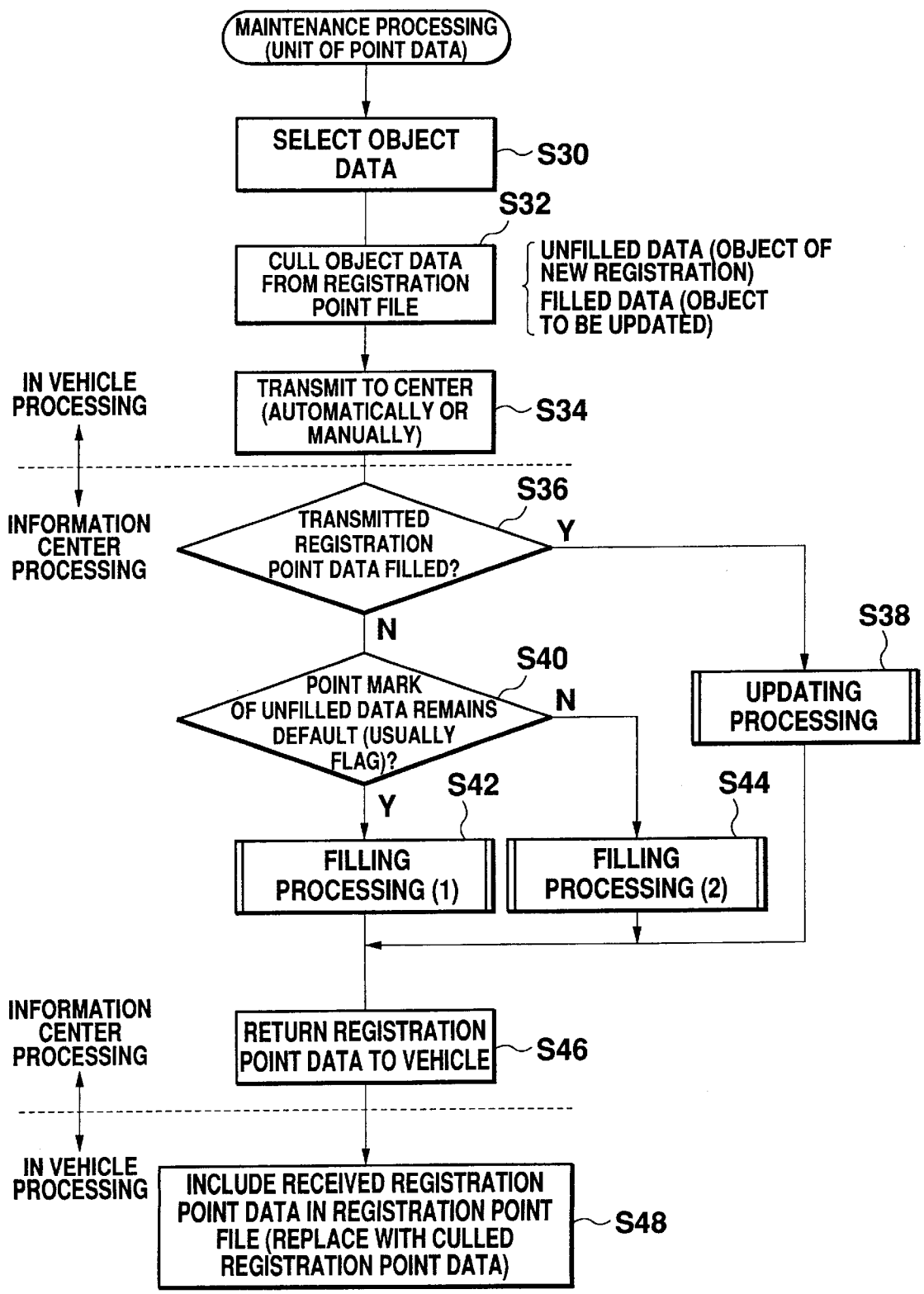
FIG. 10 is a flowchart showing the individual maintenance processing.

FIG. 10 is a flowchart showing the flow of the individual maintenance process. First, in the vehicle the registration point data is selected as a maintenance object (S30). At this step, a plurality of registration point data items may be selected. The registration point data selected as the maintenance object is automatically culled from the registration point file (S32), and the culled registration point data is transmitted to the information center 50 (S34). The transmission may be automatically performed by the navigation ECU 12 or may be performed in response to a user instruction.

In the information center, the center control section 52 judges whether or not the registration point data transmitted from the vehicle is filled (S36). When the registration point data is filled, the registration point data is updated (S38) When at S36 the registration point data is unfilled, it is judged whether or not the point mark of the data remains a default (flag) (S40) and point data having the default mark is subjected to the filling processing (1) (S42), while point data having a point mark other than the default mark is subjected to the filling processing (2) (S44). Additionally, when a number of point data items as maintenance objects are simultaneously transmitted from the vehicle, each piece of point data is subjected to the process of S36 to S44.

The registration point data subjected to the maintenance as described above is transmitted from the center control section 52 back to the vehicle (S46). In the vehicle, the registration point data received from the information center 50 is reflected in the registration point file by the navigation ECU 12 (S48). Specifically, the registration point data cut out at the S32 is replaced with the registration point data after the maintenance.

The preferred embodiment of the present invention has been described above. According to this embodiment, when the registration point data is newly registered, the user is only required to perform a simple input operation, e.g., input the position of the registration point or input the position and classification mark of the registration point. Through just this simple operation, the registration point data having rich information including various additional information is completed and stored in the memory section 22 of the vehicle. Furthermore, according to the embodiment, through the updating process, the updated information on the registration point can be used in the vehicle. At the time of the updating processing, the user does not need to perform any intricate operations. In this manner, the maintenance of the registration point file such as the new point registration and the updating of the registration point data becomes very user-friendly and the convenience of the point registration function of the navigation device is greatly enhanced.

What is claimed is:

1. A vehicle-use data processing system which comprises an information center and an on-vehicle terminal device connected to the information center via a communication means, and in which data presented by the information center is used in a vehicle, wherein the on-vehicle terminal device comprises:
 a registration point information memory for storing registration point information including a position of a registration point and facility information concerning a facility at the registration point, and
 a request means for generating a request for maintenance of the registration point information, wherein
 the on-vehicle terminal device transmits the maintenance request to the information center, and wherein
 the information center comprises;
 a facility information memory for storing the facility information together with the position of the facility, and
 a maintenance data preparation means in response to the maintenance request for preparing maintenance data to fill and/or update the registration point information of the vehicle based on the facility information stored in the facility information memory, wherein
 the information center returns the maintenance data to the on-vehicle terminal device.

2. The vehicle-use data processing system according to claim 1 wherein the registration point information stored in the vehicle at the time the maintenance request is generated is indicated in the maintenance request, and
 the maintenance data includes the updated information for updating the registration point information indicated in the maintenance request.

3. The vehicle-use data processing system according to claim 2 wherein the maintenance request includes data of the position of the registration point, a facility name, a facility classification and facility introducing information, and
 the maintenance data preparation means searches for any discrepancy between the registration point information of the vehicle and the facility information of the information center and updates the data for any detected discrepancy to prepare said maintenance data.

4. The vehicle-use data processing system according to claim 1 wherein the position of the registration point and a facility classification are indicated in said maintenance request, and
 the maintenance data includes the facility information of a facility which exists in the position of the registration point indicated in the maintenance request and belonging to said facility classification.

5. The vehicle-use data processing system according to claim 4 wherein the maintenance data preparation means uses the facility information of the facility which is nearest to the position of the registration point indicated in said maintenance request and which belongs to said facility classification to prepare the maintenance data.

6. The vehicle-use data processing system according to claim 4 wherein the maintenance data includes a facility name and facility introducing information.

7. The vehicle-use data processing system according to claim 1 wherein, at the time of transmission of the maintenance request, the on-vehicle terminal device transmits all the registration point information contained in the vehicle to said information center to request a batch maintenance processing.

8. The vehicle-use data processing system according to claim 7 wherein the maintenance data preparation means of said information center checks all the registration point information transmitted from the vehicle, updates filled registration point information, and fills any blank portions of unfilled registration point information to prepare filled registration point information.

9. The vehicle-use data processing system according to claim 8 wherein the maintenance data preparation means, when said unfilled registration point information has the position of the registration point, uses a name, a classification, and introducing information of a facility which exists in the position of the registration point to prepare filled registration point information, and when said unfilled registration point information comprises the position of the registration point and a facility classification, uses a name and introducing information of a facility which exists at the position of the registration point and belongs to said facility classification to prepare filled registration point information.

10. The vehicle-use data processing system according to claim 1 wherein, at the time of transmission of the maintenance request, the on-vehicle terminal device transmits the registration point information requesting maintenance to said information center to request an individual maintenance processing.

11. The vehicle-use data processing system according to claim 10 wherein the maintenance data preparation means of said information center checks the registration point information transmitted from the vehicle, updates the registration point information when the registration point information is not blank, and prepares filled registration point information, when the registration point information is in an unfilled condition having a blank portion.

12. The vehicle-use data processing system according to claim 11 wherein the maintenance data preparation means of said information center, when said unfilled registration point information has the position of the registration point, uses a name, a classification, and introducing information of a facility which exists in the position of the registration point to prepare filled registration point information, and when said unfilled registration point information has the position of the registration point and a facility classification, uses a name and introducing information of a facility which exists in the position of the registration point and belongs to said facility classification to prepare filled registration point information.

13. The vehicle-use data processing system according to claim 1 wherein the position of the registration point is indicated in said maintenance request, and said maintenance data includes the facility information of the facility which exists at the position of the registration point indicated in said maintenance request.

14. The vehicle-use data processing system according to claim 13 wherein the maintenance data preparation means uses the facility information of a facility nearest to the position of the registration point indicated in said maintenance request to prepare the maintenance data.

15. The vehicle-use data processing system according to claim 13 wherein the maintenance data preparation means prepares plural pieces of facility information in the vicinity of the position of the registration point indicated in said maintenance request and transmits the information to the vehicle, and the on-vehicle terminal device writes the facility information selected from said plural pieces of facility information by a user into the registration point information memory.

16. The vehicle-use data processing system according to claim 13 wherein the maintenance data includes a facility name, a facility classification, and facility introducing information.

17. The vehicle-use data processing system according to claim 16 wherein the facility introducing information includes a facility photo.

18. A navigation device having a point registration function of registering registration point information including a position of a registration point and facility information concerning a facility located at the registration point, said navigation device comprising:

an input means for inputting the position of a point which a user desires to register;

a registration point information memory for storing the registration point information; and a communication means for performing data communication with an information center, wherein said navigation device transmits the position of the registration point entered by the user to the information center and stores facility information of a facility existing in the position of the registration point supplied by the information center together with the position of the registration point in the registration point information memory.

19. The navigation device according to claim 18 wherein the user can further input a facility classification of the facility to be registered, and the facility classification is transmitted together with the position of the registration point to the information center.

20. An on-vehicle terminal device which is connected via a communication means to an information center and which uses data transmitted from the information center, comprising:

a registration point information memory for storing registration point information which includes a position of a registration point and facility information concerning a facility at the registration point; and a request means for generating a request for maintenance of the registration point information, wherein said on-vehicle terminal device uses maintenance data prepared and supplied by the information center on the basis of the facility information stored therein in response to the maintenance request to maintain the registration point information in a filled and latest condition.

* * * * *